United States Patent
Hori et al.

(10) Patent No.: US 10,655,746 B2
(45) Date of Patent: May 19, 2020

(54) SOLENOID VALVE

(71) Applicants: SOKEN, INC., Nisshin, Aichi-pref (JP); TOYOTA JIDOSHA KABUSHIKI KAISHA, Toyota-shi, Aichi-ken (JP); JTEKT CORPORATION, Osaka-shi, Osaka (JP)

(72) Inventors: Ryosuke Hori, Nishio (JP); Hiroki Yahashi, Toyota (JP); Koji Kida, Toyota (JP); Akio Nakamura, Okazaki (JP); Takuya Suzuki, Anjo (JP)

(73) Assignees: SOKEN, INC., Aichi-Pref. (JP); TOYOTA JIDOSHA KABUSHIKI KAISHA, Toyota (JP); JTEKT CORPORATION, Osaka (JP)

( * ) Notice: Subject to any disclaimer, the term of this patent is extended or adjusted under 35 U.S.C. 154(b) by 0 days.

(21) Appl. No.: 15/950,449

(22) Filed: Apr. 11, 2018

(65) Prior Publication Data
US 2018/0306343 A1 Oct. 25, 2018

(30) Foreign Application Priority Data
Apr. 24, 2017 (JP) .................. 2017-085248

(51) Int. Cl.
*F16K 31/06* (2006.01)
(52) U.S. Cl.
CPC ...... *F16K 31/0658* (2013.01); *F16K 31/0693* (2013.01)
(58) Field of Classification Search
CPC ............ F16K 31/0624; F16K 31/0655; F16K 31/0658; F16K 31/0686; F16K 31/0693

USPC ................................ 251/129.07, 129.15
See application file for complete search history.

(56) References Cited

U.S. PATENT DOCUMENTS

| | | | |
|---|---|---|---|
| 7,871,056 B2* | 1/2011 | Kratzer | B60T 8/363 251/129.02 |
| 9,068,577 B2* | 6/2015 | Kasagi | F16K 31/0613 |
| 9,163,746 B2* | 10/2015 | Voss | F16K 31/0658 |
| 9,346,447 B2* | 5/2016 | Lee | B60T 15/027 |
| 9,457,784 B2* | 10/2016 | Tokoi | B60T 7/042 |
| 9,599,249 B2* | 3/2017 | Holmes | F16K 31/0655 |
| 9,927,817 B2* | 3/2018 | Nakamura | G05D 7/00 |
| 9,945,493 B2* | 4/2018 | Warashina | F16H 61/0251 |
| 9,995,406 B2* | 6/2018 | Kuroyanagi | F17C 13/04 |
| 2018/0241052 A1* | 8/2018 | Hori | H01M 8/0258 |
| 2018/0251108 A1* | 9/2018 | Yamaguchi | B60T 8/3645 |

FOREIGN PATENT DOCUMENTS

JP 2002-372164 A 12/2002

* cited by examiner

*Primary Examiner* — Matthew W Jellett
(74) *Attorney, Agent, or Firm* — Oliff PLC (57) ABSTRACT

A solenoid valve includes a coil, a valve element receiving portion, a valve element placed inside of the valve element receiving portion, and a valve portion configured to open and close a gas flow path accompanied with move of the valve element. Either a surface of the valve element opposed to the valve element receiving portion or a surface of the valve element receiving portion opposed to the valve element has a first groove that is extended in an axial direction and a second groove that is arranged to intersect with the first groove and to be extended in a circumferential direction. The first groove is formed to be extended at least from the second groove toward a valve portion-side.

5 Claims, 11 Drawing Sheets

SOLENOID VALVE

CROSS-REFERENCE TO RELATED APPLICATIONS

The present application claims priority from Japanese patent application 2017-085248 filed on Apr. 24, 2017, the entirety of the content of which is hereby incorporated by reference into this application.

BACKGROUND

Field

The present disclosure relates to a solenoid valve.

Related Art

A solenoid valve is generally used to change over a flow path of a fluid. A known configuration of the solenoid valve generally includes a coil, a valve element configured to be moved in an axial direction with supply of electricity to the coil, and a valve portion configured to be opened and closed accompanied with move of the valve element (as described in, for example, JP 2002-372164A).

When the fluid flowing in the flow path provided with the solenoid valve is a gas, liquid water may be included in the gas. In this case, the liquid water included in the gas is likely to enter the solenoid valve. In the state that liquid water enters inside of the solenoid valve, with a decrease in temperature, the liquid water is likely to be frozen in the solenoid valve and to interfere with valve-opening and valve-closing operations of the solenoid valve and thereby interfere with normal operation of the solenoid valve.

In the solenoid valve, with a view to appropriately forming a magnetic path in the process of supplying electricity to the coil, there is generally a small distance provided between the valve element and a member placed outside of the valve element (sleeve). Liquid water is more likely to be frozen in such a narrow clearance between the valve element and the sleeve. There is accordingly a need for a technique that reduces malfunction of the solenoid valve caused by freezing of liquid water, when liquid water enters a clearance around a valve element.

SUMMARY

According to one aspect of the present disclosure, there is provided a solenoid valve used in a gas flow path. The solenoid valve comprises a coil; a valve element receiving portion placed inside of the coil; a valve element placed inside of the valve element receiving portion and configured to be moved in an axial direction with supply of electricity to the coil; and a valve portion configured to open and close the gas flow path accompanied with move of the valve element. Either a surface of the valve element opposed to the valve element receiving portion or a surface of the valve element receiving portion opposed to the valve element has a first groove that is extended in the axial direction and a second groove that is arranged to intersect with the first groove and to be extended in a circumferential direction. The first groove is formed to be extended at least from the second groove toward a valve portion-side.

DETAILED DESCRIPTION

A. First Embodiment

Figure 1:
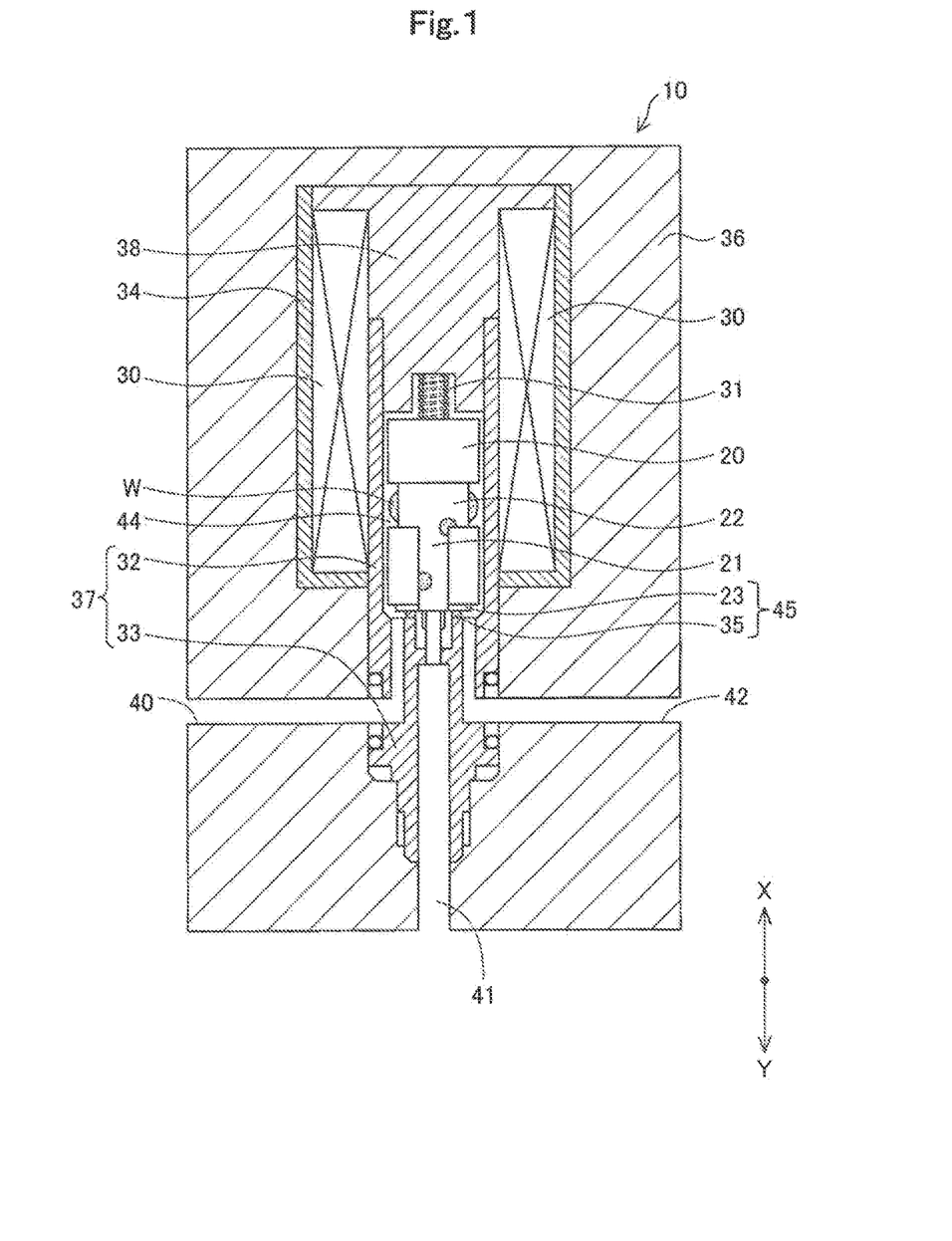
FIG. 1 is a sectional view illustrating a solenoid valve according to a first embodiment in a valve closed position.
Figure 2:
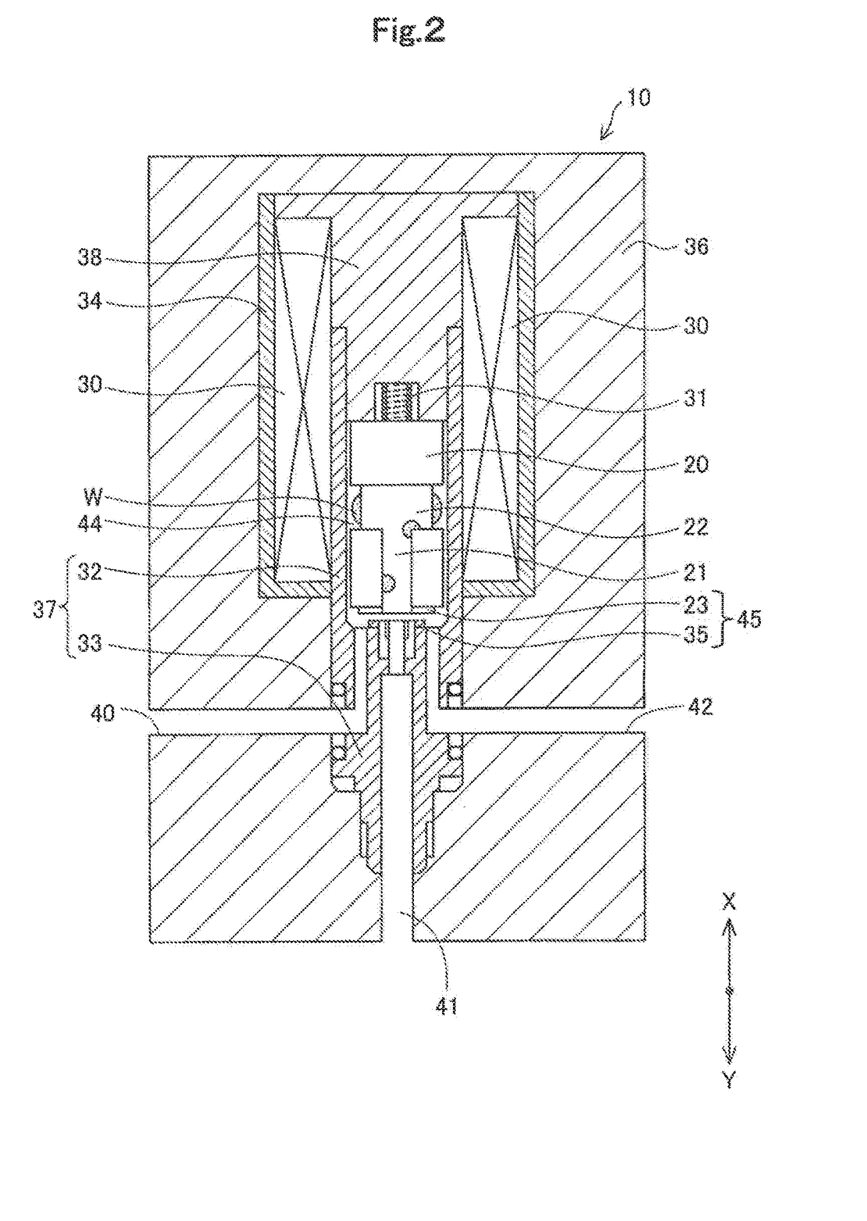
FIG. 2 is a sectional view illustrating the solenoid valve according to the first embodiment in a valve open position.

FIGS. 1 and 2 are sectional views illustrating a solenoid valve 10 according to a first embodiment of the present disclosure. FIG. 1 illustrates the solenoid valve 10 in a valve closed position, and FIG. 2 illustrates the solenoid valve 10 in a valve open position.

According to the embodiment, the solenoid valve 10 is provided in a fuel cell vehicle that is equipped with a fuel cell system including a hydrogen tank and a fuel cell. The solenoid valve 10 is used to change over a flow path arranged to supply hydrogen from outside of the fuel cell vehicle to the hydrogen tank and a flow path arranged to supply hydrogen from the hydrogen tank to the fuel cell. The solenoid valve 10 of the embodiment includes a coil 30, a main body part 37, a plunger 20, a valve portion 45, a yoke 34, a spring 31, a stopper 38, and a housing 36. The coil 30, the main body part 37, the plunger 20, the valve portion 45, the yoke 34, the spring 31 and the stopper 38 are placed in the housing 36. In the sectional views of FIGS. 1 and 2, the plunger 20 is not shown in section but is shown in its appearance shape.

Excitation and demagnetization of the coil 30 are controlled by regulating the supply of electricity to the coil 30. The coil 30 is placed in the yoke 34 in an approximately cylindrical shape. The yoke 34 forms part of a magnetic path in the course of supply of electricity to the coil 30. The yoke 34 is also called magnetic path-forming member.

The plunger 20 is a magnetic body and is configured to move according to the excitation and demagnetization of the coil 30. In the description below, a direction of a center axis of the plunger 20 and the coil 30 is called axial direction. A direction perpendicular to the axial direction is called horizontal direction. With regard to the horizontal direction, especially a direction passing through the center axis is called radial direction. With regard to the axial direction, a direction in which the plunger 20 moves according to the excitation of the coil 30 is called valve-opening direction and is shown as X direction in FIGS. 1 and 2. The solenoid valve 10 of the embodiment is characterized by a surface configuration of the plunger 20. The surface configuration of the plunger 20 will be described later in detail. The plunger 20 is also called valve element.

The spring 31 has one end mounted to the plunger 20 and serves to press the plunger 20 in an opposite direction to the valve-opening direction. In the description below, with regard to the axial direction, the opposite direction to the valve-opening direction is also called valve-closing direction and is shown as Y direction in FIGS. 1 and 2.

The main body part 37 includes a sleeve 32 and a base portion 33. The sleeve 32 is an approximately cylindrical portion of the main body part 37 that is placed inside of the coil 30, and the base portion 33 is a portion of the main body part 37 that is placed on a Y direction side of the coil 30 and that is configured to form a flow path (described later) inside thereof. A connecting space 44 is formed inside of the main body part 37, and the plunger 20 is placed in this connecting space 44. The sleeve 32 is a member opposed to a side face of the plunger 20. The sleeve 32 is also called valve element receiving portion.

A plurality of flow paths are formed inside of the base portion 33 and are provided to be continuous with a flow path formed inside of the housing 36. More specifically, flow paths 40 to 42 are formed as the flow paths formed inside of the base portion 33 to be continuous with the flow path formed inside of the housing 36. The flow path 40 is arranged to be connected with a hydrogen tank (not shown) and with the connecting space 44 and is configured to introduce a high-pressure hydrogen gas discharged from the hydrogen tank, to the connecting space 44. The flow path 41 is arranged to be connectable with an anode-side flow path of a fuel cell (not shown) and with the connecting space 44 and is configured to supply hydrogen supplied from the hydrogen tank to the connecting space 44 via the flow path 40, to the fuel cell when the solenoid valve 10 is opened. The flow path 42 is arranged to be connected with an on-off valve (not shown) and with the connecting space 44. The on-off valve is normally closed and is opened to discharge hydrogen gas in the connecting space 44 to outside.

The stopper 38 is fixed inside of the coil 30 and forms, in combination with the sleeve 32, part of a wall surface of the connecting space 44 described above. The other end of the spring 31 is fixed to the stopper 38.

The valve portion 45 includes a valve element leading end 23 and a valve seat 35. The valve element leading end 23 is provided at a Y-direction end of the plunger 20. The valve seat 35 is provided on an inner wall surface of the main body part 37 (base portion 33) to be opposed to the valve element leading end 23 and is arranged at a position to abut on the valve element leading end 23 in a surface where the flow path 41 is open. More specifically, the valve seat 35 is provided to surround the entire outer circumference of the opening of the flow path 41. The valve seat 35 may be made of, for example, a rubber or a resin. The solenoid valve 10 is closed when the valve element leading end 23 is seated on the valve seat 35, and is opened when the valve element leading end 23 is separated from the valve seat 35. This opens and closes a gas flow path that causes the flow path 40 and the flow path 41 to be connected with each other.

FIG. 1 illustrates the state of demagnetization of the solenoid valve 10, i.e., the state that no electric current is flowed in the coil 30 and no suction force is generated to pull up the plunger 20. In this state, the valve portion 45 is closed by the spring 31, so that hydrogen gas in the connecting space 44 is not supplied to the fuel cell on the flow path 41-side.

FIG. 2 illustrates the state of excitation of the solenoid valve 10, i.e., the state that electric current is flowed in the coil 30. In this state, the valve portion 45 is opened, so that hydrogen gas supplied from the hydrogen tank to the connecting space 44 via the flow path 40 is supplied to the fuel cell via the flow path 41.

Figure 3:
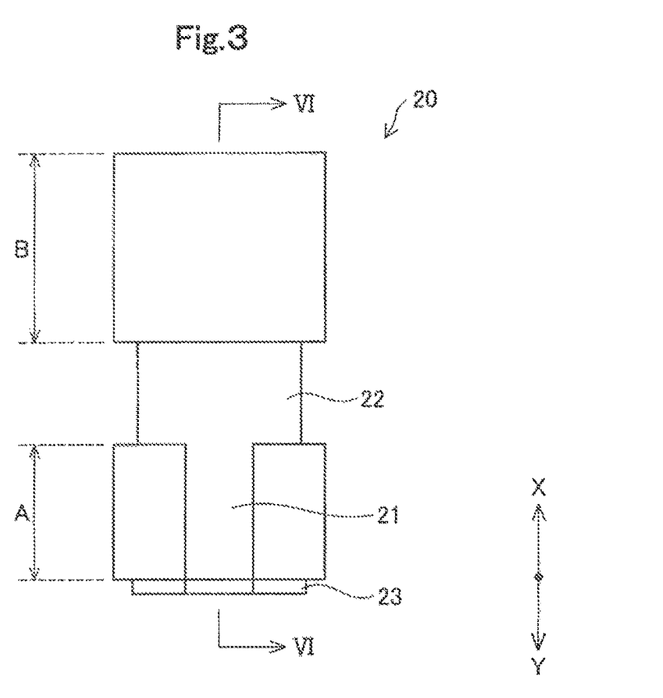
FIG. 3 is a diagram illustrating close-up of the appearance of a plunger.

FIG. 3 is a diagram illustrating close-up of the appearance of the plunger 20. The plunger 20 includes a first groove 21 and a second groove 22 that are provided on its side face or more specifically on a surface opposed to the sleeve 32. The first groove 21 is a groove that is extended in the axial direction from the Y-direction end (valve portion 45-side end) of the plunger 20 toward the X direction side. The second groove 22 is a ring-shaped groove that is arranged to intersect with an X-direction end of the first groove 21 and that is extended in the circumferential direction of the plunger 20.

The plunger 20 of this embodiment is formed in an approximately columnar shape as a whole. A remaining region of the plunger 20 other than the region where the first groove 21 and the second groove 22 are provided is formed to have a substantially identical outer diameter. Accordingly, the region of the plunger 20 where the first groove 21 and the second groove 22 are provided has a longer distance to the sleeve 32 serving as the valve element receiving portion, compared with the remaining region of the plunger 20.

Even when liquid water included in the gas that is to be supplied to the solenoid valve 10 enters a clearance between the plunger 20 and the sleeve 32 and is frozen, the configuration of the solenoid valve 10 of the embodiment described above reduces malfunction of the solenoid valve 10 caused by freezing of water. The following describes reduction of malfunction of the solenoid valve 10 caused by freezing of water more in detail.

Figure 4:
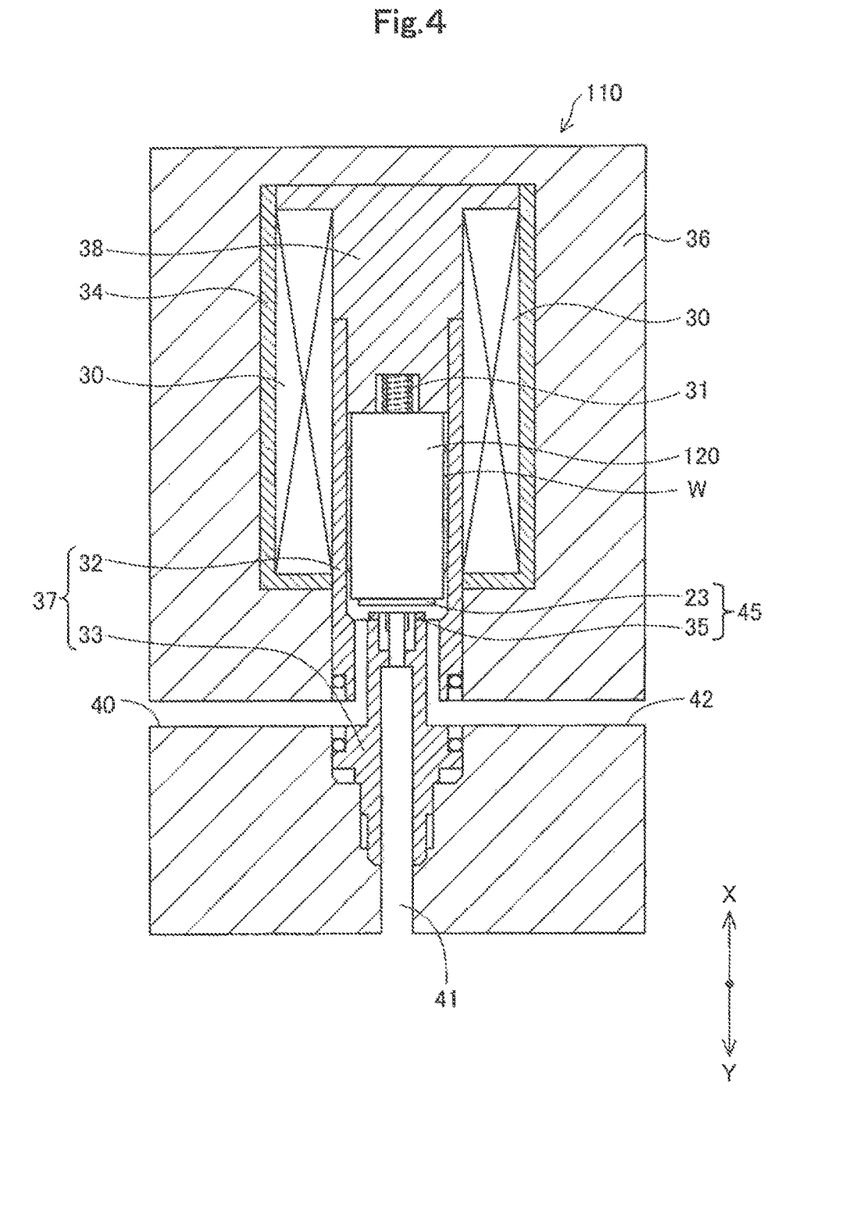
FIG. 4 is a sectional view illustrating the configuration of a solenoid valve according to a comparative example.

FIG. 4 is a sectional view illustrating the configuration of a solenoid valve 110 including a plunger 120 in place of the plunger 20 as a comparative example. The solenoid valve 110 has a similar configuration to that of the solenoid valve 10 except the plunger 120. The like components are expressed by the like reference signs and are not specifically described here. In the sectional view of FIG. 4, the plunger 120 is not shown in section but is shown in appearance shape.

As shown in FIG. 4, the plunger 120 has a flat side face without the first groove 21 and the second groove 22, so that the side face of the plunger 120 uniformly approaches the sleeve 32. Liquid water entering a clearance between the plunger 120 and the sleeve 32 is accordingly spread over a wide range of the clearance both in the axial direction and in the circumferential direction. When this liquid water is frozen, the frozen water interferes with the motion of the plunger 120 in the axial direction and is thus likely to cause malfunction of the solenoid valve 110.

In the solenoid valve 10 of the embodiment, on the other hand, the plunger 20 is provided with the first groove 21 and the second groove 22. When a small volume of liquid water enters the clearance between the plunger 20 and the sleeve 32, entering liquid water W is kept in the first groove 21 and the second groove 22, as shown in FIGS. 1 and 2. This configuration accordingly suppresses the entering liquid water W from being spread over in the clearance between the plunger 20 and the sleeve 32. Even when the entering liquid water is frozen, this configuration suppresses interference with the motion of the plunger 20 in the axial direction caused by the frozen water.

Even when the volume of liquid water entering the clearance between the plunger 20 and the sleeve 32 increases to occupy the total capacity of the first groove 21 and the second groove 22, the longer interval between the region of the plunger 20 with the first groove 21 and the second groove 22 and the sleeve 32 serves to keep the liquid water therein. This configuration suppresses the liquid water from being spread to the remaining region of the plunger 20 that has the shorter interval to the sleeve 32. The liquid water that is present as the larger mass in the wider space is more unlikely to be frozen, compared with the liquid water that is thinly spread in the narrower space. Accordingly, the configuration that causes liquid water to be kept by the first groove 21 and the second groove 22 effectively reduces malfunction of the solenoid valve 10 caused by freezing of liquid water.

In the solenoid valve 10, the second groove 22 extended in the circumferential direction serves to introduce the liquid water entering the clearance between the plunger 20 and the sleeve 32, in the circumferential direction and thereby suppress the liquid water from being spread in the axial direction. When liquid water is frozen in the clearance between the plunger 20 and the sleeve 32, the smaller range where the frozen water is spread in the axial direction makes it easier to eliminate the fixation of the plunger 20 caused by freezing of water when the plunger 20 is moved in the axial direction. This configuration enables liquid water to be introduced in the circumferential direction. Even when the liquid water is frozen, this configuration accordingly facilitates elimination of the fixation of the plunger 20 and reduces a potential problem caused by freezing of water.

The presence of the second groove 22 in addition to the first groove 21 in the plunger 20 makes it easier to discharge the liquid water entering the clearance between the plunger 20 and the sleeve 32 and enhances the advantageous effect of reducing malfunction of the solenoid valve 10 caused by freezing of liquid water. When high-pressure hydrogen gas is supplied to the solenoid valve 10, the hydrogen gas forms a flow that flows into the clearance between the plunger 20 and the sleeve 32, flows in the clearance in the X direction, flows in the Y direction after reaching its X-direction end near to the spring 31 and is discharged from the clearance. The first groove 21 formed in the plunger 20 serves to discharge the liquid water accumulated in the first groove 21 and the second groove 22, while the hydrogen gas flows in the Y direction.

A strategy of increasing the distance between the plunger 120 and the sleeve 32 may be employed for the solenoid valve 110 of the comparative example shown in FIG. 4, with a view to reducing the possibility that the entering liquid water is frozen. Increasing the distance between the plunger 120 and the sleeve 32, however, requires a higher electric current to be flowed in the coil 30, in order to pull up the plunger 120 when the solenoid valve 110 is opened. This strategy increases power consumption and is thus not preferably adopted. The configuration of the embodiment, however, allows the distance between the plunger 20 and the sleeve 32 to be sufficiently decreased in the remaining portion of the plunger 20 other than the portion where the first groove 21 and the second groove 22 are formed. This configuration reduces the disadvantage that a higher electric current is to be flowed in the coil 30.

A reason why liquid water is included in the hydrogen gas that is supplied to the solenoid valve 10 may be, for example, penetration of rainwater from a supply port of hydrogen gas in the fuel cell vehicle equipped with the solenoid valve 10 in the process of filling the hydrogen gas into the hydrogen tank of the fuel cell vehicle. Another possible reason is condensation of water vapor that is likely to be included in the hydrogen gas when the hydrogen gas to be supplied has a relatively low purity. When liquid water is included in the hydrogen gas, the liquid water is likely to enter the clearance between the plunger 20 and the sleeve 32 by the pressure of the hydrogen gas in the process of supplying the high-pressure hydrogen gas into the solenoid valve 10.

A reason why liquid water is frozen in the solenoid valve 10 may be, for example, a decrease in environment temperature of the fuel cell vehicle. When liquid water entering the clearance between the plunger 20 and the sleeve 32 is frozen with a decrease in environment temperature during a stop of the fuel cell system, the frozen water is likely to interfere with a valve-opening operation of the solenoid valve 10 at a next start of the fuel cell system and is thus likely to cause a problem in supply of hydrogen gas to the fuel cell.

Another reason why liquid water is frozen in the solenoid valve 10 may be the low temperature of the hydrogen gas that is to be supplied to the solenoid valve 10. This is likely to cause liquid water to be frozen in the solenoid valve 10 in the valve open position of the solenoid valve 10. For example, in the process of taking out the hydrogen gas from the hydrogen tank that is configured to store high-pressure hydrogen gas, adiabatic expansion of the hydrogen gas in the hydrogen tank decreases the temperature of the hydrogen gas that is released from the hydrogen tank. Continuously supplying the low-temperature hydrogen gas decreases the temperature of the solenoid valve 10 and is likely to cause the liquid water entering the clearance between the plunger 20 and the sleeve 32 to be frozen. When the liquid water is frozen in the valve open position of the solenoid valve 10, the frozen water is likely to interfere with a valve-closing operation of the solenoid valve 10 at a stop of power generation in the fuel cell. As a result, this is likely to cause a problem due to supply of unrequired hydrogen gas to the fuel cell during a stop of power generation in the fuel cell.

In FIG. 3, a distance A denotes a distance between a valve portion 45-side end (Y-direction end) of the plunger 20 and the second groove 22, and a distance B denotes a distance between an opposite end (X-direction end) opposite to the valve portion 45-side end of the plunger 20 and the second groove 22. The valve portion 45-side end of the plunger 20 is a Y-direction end of the remaining portion of the plunger 20 that has an approximately constant distance to the sleeve 32 and that is other than the region where the first groove 21 and the second groove 22 are provided. According to the embodiment, the valve element leading end 23 is formed to have a decreased diameter. According to the embodiment, the Y-direction end of the plunger 20 thus indicates a boundary between the plunger 20 and the valve element leading end 23.

The magnitude relationship between the distance A and the distance B may be set arbitrarily and may be distance A<distance B. Liquid water penetrates from a Y-direction end of the plunger 20 to enter the clearance between the plunger 20 and the sleeve 32. The positional relationship of distance A<distance B enables the entering liquid water to be more promptly introduced into the second groove 22. This causes the entering liquid water to be more quickly spread in the circumferential direction and thereby suppresses the liquid water from being spread in the axial direction. This further facilitates elimination of the fixation of the plunger 20 caused by freezing of the entering liquid water. Additionally, the positional relationship of distance A<distance B enables the liquid water to be more promptly kept in the second groove 22 that is provided in the region of the plunger 20 having a longer distance between the plunger 20 and the sleeve 32. This configuration suppresses the liquid water from being frozen and enhances the advantageous effect of reducing a potential problem caused by freezing of water.

Figure 5:
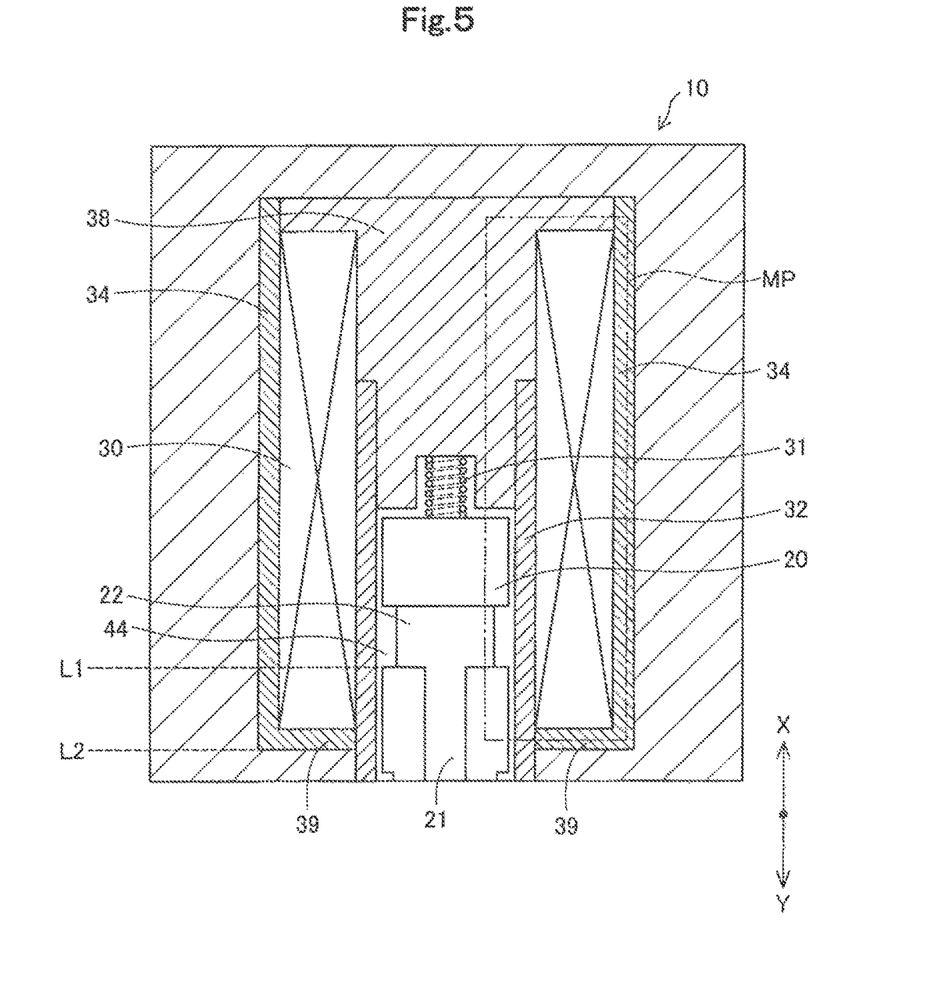
FIG. 5 is a diagram illustrating close-up of a portion including a coil and a plunger.

FIG. 5 is a diagram illustrating close-up of a portion including the coil 30 and the plunger 20 in FIG. 1. In the solenoid valve 10, when electricity is supplied to the coil 30, a magnetic path is formed around the coil 30 to go through the plunger 20, the stopper 38, the sleeve 32, and the yoke 34. A positional relationship of these members may be set arbitrarily as long as a suction force is generated to move the plunger 20 by supplying electricity to the coil 30. It is, however, preferable to determine the positional relationship, with a view to facilitating formation of the magnetic path. The following describes the positional relationship between the plunger 20 and the yoke 34 that is configured to place the oil 30 inside thereof and form part of the magnetic path.

A magnetic path MP formed in the process of supplying electricity to the coil 30 to open the solenoid valve 10 is conceptually shown by a one-dot chain line in FIG. 5 in the valve closed position like FIG. 1. The yoke 34 includes a bottom face portion 39 that is placed on the valve portion 45-side of the coil 30 in the axial direction, in addition to a cylindrical portion that is extended in the axial direction. More specifically, the bottom face portion 39 of the yoke 34 is formed to cover the valve portion 45-side end (Y-direction end) of the coil 30 and to be extended inward in the radial direction. A broken line L2 shown in FIG. 5 indicates a position overlapping with a Y-direction end of the bottom face portion 39 in the horizontal direction at an end of the bottom face portion 39 near to the sleeve 32. A broken line L1 shown in FIG. 5 indicates a position overlapping with a Y-direction end of the second groove 22 in the horizontal direction in the valve closed position.

As shown in FIG. 5, the Y-direction end of the bottom face portion 39 at the end of the bottom face portion 39 near to the sleeve 32 may be placed to be on the valve portion 45-side (Y-direction side) of the Y-direction end of the second groove 22 in the valve closed position (i.e., to place the broken line L2 on the Y-direction side of the broken line L1). This configuration allows the end of the bottom face portion 39 to become closest to the plunger 20 at the position on the Y-direction side of the second groove 22 in the valve closed position. Compared with a configuration that the Y-direction end at the end of the bottom face portion 39 becomes closest to the plunger 20 at the position of the second groove 22, this configuration shortens the distance between the end of the bottom face portion 39 and the plunger 20. Even when the plunger 20 is provided with the second groove 22, this configuration makes it easier to form the magnetic path in the process of supplying electricity to the coil 30 in the valve closed position and reduces power consumption of the solenoid valve 10. It is, however, not essential to place the broken line L2 on the Y-direction side of the broken line L1. Even when this positional relationship is not satisfied, the presence of the first groove 21 and the second groove 22 has the above advantageous effect of reducing a potential problem caused by freezing of water.

In the configuration that the broken line L2 is located on the Y-direction side of the broken line L1 in the valve closed position, even when the plunger 20 is sucked in the X direction in the valve open position, the position of the broken line L2 is kept on the Y-direction side of the position of the broken line L1 (position of the Y-direction end of the second groove 22). In the solenoid valve 10, the region of the plunger 20 on the Y-direction side of the second groove 22 may overlap with the end of the bottom face portion 39 in the horizontal direction both in the valve closed position and in the valve open position.

In the solenoid valve 10 of the embodiment, the bottom face portion 39 is formed as part of the yoke 34. This configuration is, however, not restrictive, and a different configuration may be employed. The solenoid valve may have any configuration, as long as the solenoid valve is provided with a magnetic path-forming member that forms part of the magnetic path and that includes the bottom face portion 39 located on the Y-direction side of the coil 30, and the end of the bottom face portion 39 on the side near to the sleeve 32 is located on the Y-direction side of the Y-direction end of the second groove 22 formed in the plunger 20.

Figure 6:
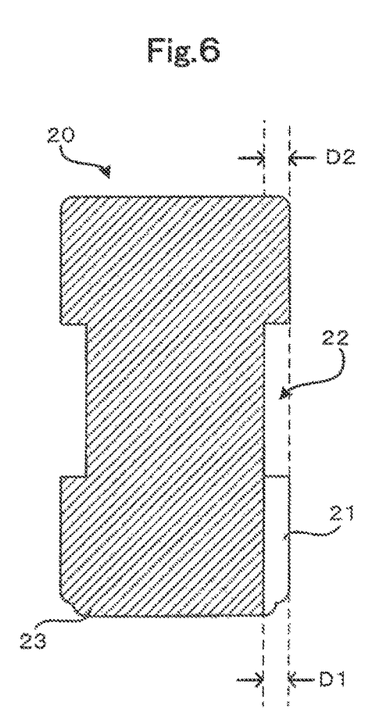
FIG. 6 is a sectional view illustrating a configuration of the plunger.
Figure 7:
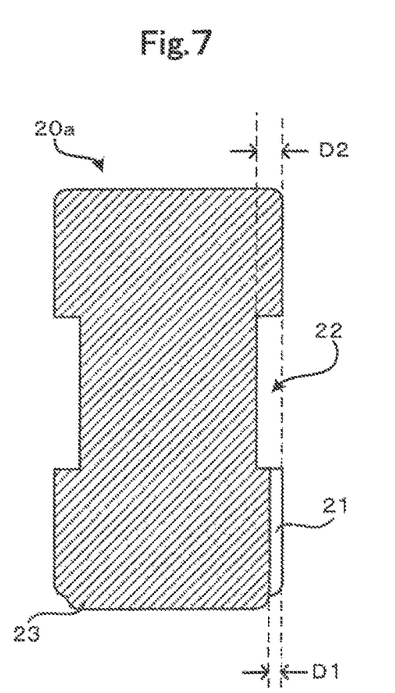
FIG. 7 is a sectional view illustrating another configuration of the plunger.
Figure 8:
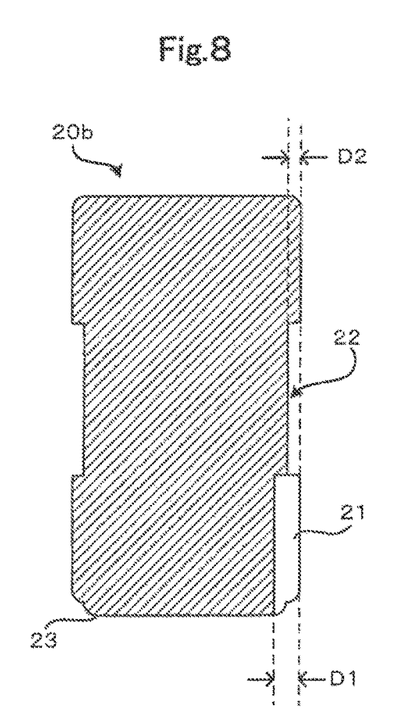
FIG. 8 is a sectional view illustrating another configuration of the plunger.

FIGS. 6 to 8 are sectional views illustrating plungers according to the embodiment and modifications of the embodiment. FIG. 6 is a sectional view illustrating the plunger 20 included in the solenoid valve 10 of the first embodiment, in a VI-VI section of FIG. 3. More specifically, FIG. 6 illustrates a section of the plunger 20 including the first groove 21 and the second groove 22 about the center axis of the plunger 20. FIG. 7 is a sectional view illustrating a plunger 20a according to a first modification of the first embodiment, in a similar section to that of FIG. 6. FIG. 8 is a sectional view illustrating a plunger 20b according to a second modification of the first embodiment, in a similar section to that of FIG. 6. In FIGS. 6 to 8, a depth D1 denotes the depth of the first groove 21, and D2 denotes the depth of the second groove 22. As shown in FIGS. 6 to 8, the depth of the first groove 21 and the depth of the second groove 22 may be set arbitrarily.

As shown in FIG. 6, in the plunger 20 of the embodiment, the depth D1 of the first groove 21 is equal to the depth D2 of the second groove 22. This configuration facilitates formation of the first groove 21 and the second groove 22 in the plunger 20. Facilitating the formation reduces the manufacturing cost. As shown in FIG. 7, in the plunger 20a, the depth D1 of the first groove 21 is less than the depth D2 of the second groove 22. This configuration further decreases the distance between the plunger as a whole and the bottom face portion 39 of the yoke 34 and further facilitates formation of the magnetic path. Easy formation of the magnetic path reduces the power consumption in the process of supplying electricity to the coil 30. As shown in FIG. 8, in the plunger 20b, the depth D1 of the first groove 21 is greater than the depth D2 of the second groove 22. This configuration makes it easier to discharge the liquid water accumulated in the second groove 22, via the first groove 21. This accordingly enhances the advantageous effect of suppressing the liquid water accumulated between the plunger and the sleeve 32 from being frozen.

B. Second Embodiment

Figure 9:
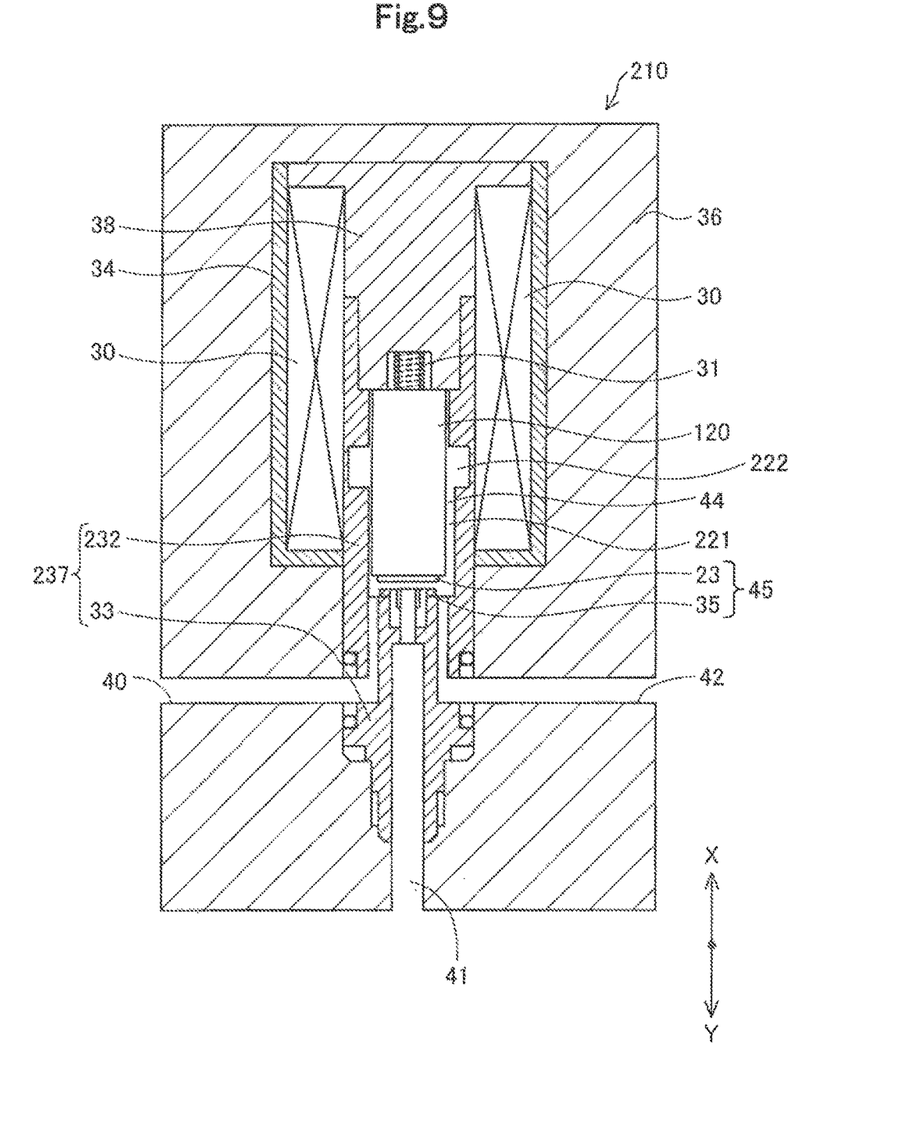
FIG. 9 is a sectional view illustrating a solenoid valve according to a second embodiment in a valve open position.

FIG. 9 is a sectional view illustrating a solenoid valve 210 according to a second embodiment of the present disclosure, like FIGS. 1 and 2. The solenoid valve 210 has a similar configuration to that of the solenoid valve 10 of the first embodiment, except that a plunger 120 like FIG. 4 is provided in place of the plunger 20 of the solenoid valve 10 and that a main body part 237 is provided in place of the main body part 37 of the solenoid valve 10. The like components to those of the first embodiment are expressed by the like reference signs and are not specifically described here. The main body part 237 of the second embodiment includes a sleeve 232, in place of the sleeve 32. The plunger 120 is also called valve element, and the sleeve 232 is also called valve element receiving portion. FIG. 9 illustrates a valve open position like FIG. 2.

In the solenoid valve 210, the plunger 120 does not have the first groove 21 and the second groove 22, but a first groove 221 and a second groove 222 are formed in an inner wall surface of the sleeve 232, i.e., a surface of the sleeve 232 opposed to the plunger 120. The first groove 221 is a groove that is extended in the axial direction from a Y-direction end of the inner wall surface of the sleeve 232 opposed to a side face of the plunger 120 toward the X direction side. The second groove 222 is a ring-shaped groove that is arranged to intersect with an X-direction end of the first groove 221 and that is extended in the circumferential direction of the sleeve 232. A region of the sleeve 232 where the first groove 221 and the second groove 222 are provided has a longer distance between the sleeve 232 serving as the valve element receiving portion and the plunger 120, compared with a remaining region of the sleeve 232.

The configuration of the solenoid valve 210 of this embodiment described above includes the first groove 221 and the second groove 222 provided in the sleeve 232 and accordingly has similar advantageous effects to those of the first embodiment. Even when liquid water included in the gas that is to be supplied to the solenoid valve 210 enters a clearance between the plunger 120 and the sleeve 232 and is frozen, this configuration reduces malfunction of the solenoid valve 210 caused by freezing of water. More specifically, the first groove 221 and the second groove 222 serve to keep liquid water therein and accordingly suppress the liquid water from being frozen. The presence of the second groove 222 extended in the circumferential direction serves to introduce the liquid water entering the clearance between the plunger 120 and the sleeve 232, in the circumferential direction and thereby suppress the liquid water from being spread in the axial direction. As a result, when the entering liquid water is frozen, this configuration facilitates elimination of the fixation of the plunger 120 caused by freezing of water. The presence of the second groove 222 in addition to the first groove 221 makes it easier to discharge the liquid water accumulated in the first groove 221 and enhances the advantageous effect of reducing malfunction of the solenoid valve 210 caused by freezing of liquid water.

Figure 10:
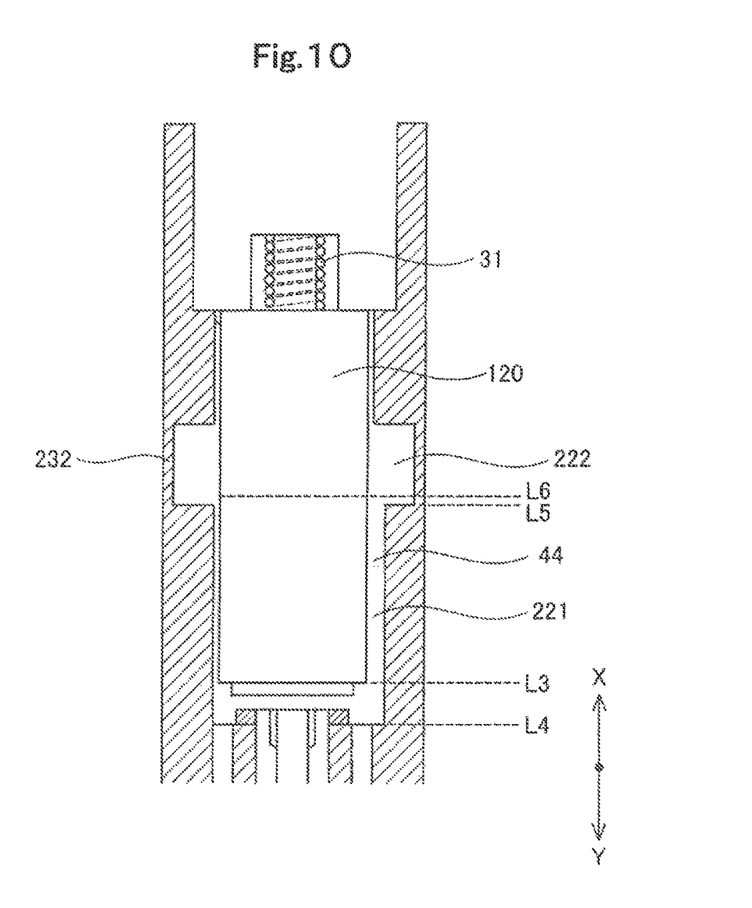
FIG. 10 is a diagram illustrating close-up of a portion including a sleeve and a plunger.

FIG. 10 is a diagram illustrating close-up of a portion including the sleeve 232 and the plunger 120 in FIG. 9. A broken line L3 shown in FIG. 10 indicates a position overlapping with a valve portion 45-side end (Y-direction end) of the plunger 120 in the horizontal direction in the valve-open position. A broken line L4 shown in FIG. 10 indicates a position of a Y-direction end of the first groove 221. According to the second embodiment, the first groove 221 is formed to be extended from the Y-direction end of the inner wall surface of the sleeve 232 opposed to the side face of the plunger 120 toward the X direction side. This configuration is, however, not restrictive and a different configuration may be employed. The first groove 221 may have any configuration, as long as the first groove 221 is formed to be extended in the axial direction from a Y-direction side of the position overlapping with the valve portion 45-side end of the plunger 120 in the horizontal direction (position of the broken line L3) toward the X direction side in the valve open position. This configuration enables liquid water accumulated in the second groove 222 to be discharged via the first groove 221 by using the flow of hydrogen gas. In order to achieve the advantageous effect described above immediately after a valve-opening operation of the solenoid valve 210, the first groove 221 may be formed to be extended in the axial direction from the Y-direction side of the position overlapping with the valve portion 45-side end of the plunger 120 in the horizontal direction toward the X direction side even in the valve closed position.

Additionally, a broken line L5 shown in FIG. 10 indicates a position overlapping with a valve portion 45-side end of the second groove 222 provided in the sleeve 232 in the horizontal direction. A broken line L6 shown in FIG. 10 indicates a position overlapping with the center in the axial direction of the plunger 120 in the horizontal direction in the valve open position. A positional relationship between the broken line L5 and the broken line L6 may be set arbitrarily, and the broken line L5 may be placed on the valve portion 45-side of the broken line L6. More specifically, a Y direction end of the second groove 222 may be placed on the valve portion 45-side of the center in the axial direction of the plunger 120 in the valve open position. When liquid water enters from a valve portion 45-side end of the plunger 120 into the clearance between the plunger 120 and the sleeve 232, this configuration enables the entering liquid water to be more promptly introduced into the second groove 222. This enhances the advantageous effect of reducing the problem of fixation of the plunger 120 caused by freezing of liquid water.

According to the second embodiment, the first groove 221 is formed to be shallower than the second groove 222 (as shown in FIGS. 9 and 10), like the configuration of the first modification of the first embodiment shown in FIG. 7. This configuration is, however, not restrictive and a different configuration may be employed. For example, the first groove 221 and the second groove 222 may be formed to have identical depths, like the configuration of the first embodiment shown in FIG. 6. In another example, the first groove 221 may be formed to be deeper than the second groove 222, like the configuration of the second modification of the first embodiment shown in FIG. 8.

C. Modifications

Modification 1

In the solenoid valve 10 of the first embodiment or the solenoid valve 210 of the second embodiment described above, the second groove 22 or 222 extended in the circumferential direction is arranged to overlap with the X-direction end of the first groove 21 or 221 extended in the axial direction. This configuration is, however, not restrictive and a different configuration may be employed. For example, the second groove may be arranged to intersect with the first groove at a position on the Y-direction side of the X-direction end of the first groove. This modified configuration also enables liquid water to be introduced in the circumferential direction and accordingly has similar advantageous effects. In order to securely introduce the liquid water entering the clearance between the plunger and the sleeve, in the circumferential direction, the second groove may be overlap with the X-direction end of the first groove.

In the solenoid valve 10 of the first embodiment, the first groove 21 is formed to be extended in the axial direction from the valve portion 45-side end (Y-direction end) of the plunger 20 toward the X direction side. This configuration is, however, not restrictive and a different configuration may be employed. For example, the Y-direction end of the first groove 21 may be arranged to be away from the Y-direction end of the plunger 20. In the solenoid valve 210 of the second embodiment, the valve portion 45-side end (Y-direction end) of the first groove 221 is located on the Y-direction side of the Y-direction end of the plunger 120 in the valve open position. This configuration is, however, not restrictive and a different configuration may be employed. For example, the Y-direction end of the first groove 221 may be located on the X-direction side of the Y-direction end of the plunger 120 in the valve open position.

As described above, the first groove and the second groove may have any configuration, as long as the second groove is arranged to intersect with the first groove at a position away from the Y-direction end of the first groove and to be extended in the circumferential direction.

Modification 2

In the solenoid valve 10 of the first embodiment or the solenoid valve 210 of the second embodiment described above, the second groove 22 or 222 is formed as a ring-shaped groove to be continuous around the whole circumference of the plunger 20 or around the whole circumference of the sleeve 232. This configuration is, however, not restrictive and a different configuration may be employed. The second groove 22 or 222 may have any configuration as long as the second groove 22 or 222 is arranged to intersect with the first groove 21 or 221 and to be extended in the circumferential direction over the width in the circumferential direction of the first groove 21 or 221. In order to ensure the performance of the second groove 22 or 222 to keep liquid water therein, however, the second groove 22 or 222 extended in the circumferential direction may have a longer length. More specifically, the length of the second groove 22 or 222 extended in the circumferential direction may not be less than one third the length of the entire circumference of the plunger 20 or the sleeve 232, may not be less than half the length of the entire circumference and may not be less than two thirds the length of the entire circumference.

Modification 3

The solenoid valve 10 of the first embodiment or the solenoid valve 210 of the second embodiment described above is provided with a single first groove 21 or 221 but may be provided with multiple first grooves 21 or 221. The smaller number of the first grooves 21 or 221 makes it easier to secure the distance between the sleeve 32 or 232 and the plunger 20 or 120 and thereby facilitates formation of the magnetic path. The larger number of the first grooves 21 or 221, on the other hand, improves the efficiency of discharge of water from the second groove 22 or 222 via the first groove 21 or 221. In the configuration provided with one or multiple first grooves 21 or 221, increasing the thickness of the first groove 21 or 221, i.e., increasing the sectional area in the horizontal direction of the first grooves 21 or 221 reduces the possibility that liquid water in the first groove 21 or 221 is frozen. Decreasing the thickness of the first groove 21 or 221, on the other hand, enables the surrounding liquid water to be more readily introduced into the first groove 21 or 221 by capillarity. The configuration of the first groove may be set arbitrarily to provide a desired effect of reducing a potential problem caused by freezing of water, according to the operating environment and the operating conditions of the solenoid valve.

Modification 4

The solenoid valve 10 of the first embodiment is provided with a single second groove 22 but may be provided with multiple second grooves.

Figure 11:
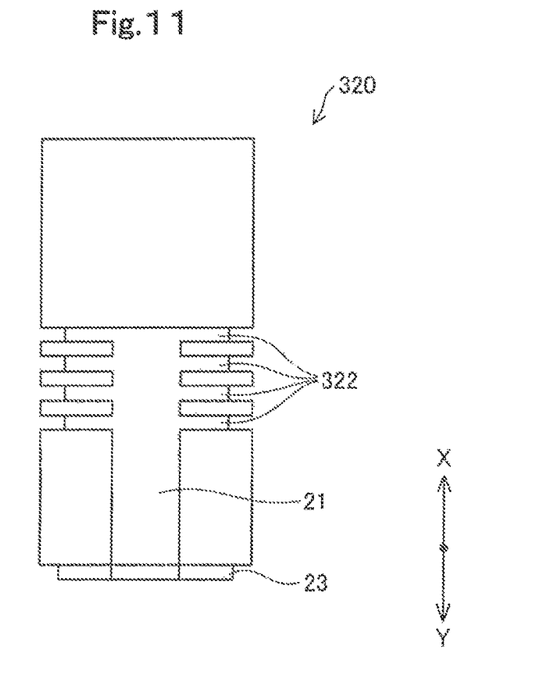
FIG. 11 is a diagram illustrating the appearance of a plunger according to a modification.

FIG. 11 is a diagram illustrating the appearance of a plunger 320 as one example of such modification. The plunger 320 may be used in place of the plunger 20 in the solenoid valve 10. The plunger 320 includes a first groove 21 and a second groove 322, in place of the second groove 22. Like the second groove 22, the second groove 322 is arranged to intersect with the first groove 21 and to be extended in the circumferential direction. The second groove 322 is, however, divided into multiple (four in the example of FIG. 11) divisional grooves that are arranged to be parallel to one another, unlike the second groove 22. Such division of the second groove 322 enables the surrounding liquid water to be more readily introduced into the second groove 322 by capillarity. The number of division of the second groove 322 and the thickness of each divisional groove are not specifically limited but may be set arbitrarily by taking into account the degree of the effect of reducing a potential problem caused by freezing of water and the complication of dividing work. Similarly, in the solenoid valve 210 of the second embodiment, the second groove 222 provided in the sleeve 232 may be divided into multiple divisional grooves.

Modification 5

In the solenoid valve 10 of the first embodiment or the solenoid valve 210 of the second embodiment described above, the sleeve 32 or 232 serving as the valve element receiving portion and the base portion 33 are integrally formed as the main body part 37 or 237. The sleeve and the base portion may, however, be formed separately.

Modification 6

In the solenoid valve 10 of the first embodiment or the solenoid valve 210 of the second embodiment described above, the entire structure including the coil 30, the main body part 37, the plunger 20 or 120, the valve portion 45, the yoke 34, the spring 31 and the stopper 38 is placed in the housing 36. This configuration is, however, not restrictive and a different configuration may be employed. The solenoid valve may have any configuration as long as part of this structure is placed in the housing 36 and the flow path formed in the base portion 33 is arranged to be connectable with the hydrogen tank and with the fuel cell.

Modification 7

The solenoid valve 10 of the first embodiment or the solenoid valve 210 of the second embodiment is configured as the directly-driven solenoid valve but may have a different configuration. For example, the present disclosure may be applied to a pilot solenoid valve. In this application, for example, a pilot valve may be a valve element, and a member provided to place the pilot valve inside thereof may be a valve element receiving portion. In another example, a main valve that is opened by opening a pilot valve may be a valve element, and a member provided to place the main valve inside thereof may be a valve element receiving portion. The valve element is not limited to the plunger that is directly opened by excitation of the coil but may be moved in the axial direction to be opened with supply of electricity to the coil, like the main valve of the pilot solenoid valve. In this application, forming grooves similar to the first groove and the second groove described above in either the valve element or the valve element receiving portion provides similar advantageous effects to those of the above embodiments.

Modification 8

The solenoid valve 10 of the first embodiment or the solenoid valve 210 of the second embodiment is provided in the flow path of hydrogen gas. This configuration is, however, not restrictive. The solenoid valve of the present disclosure may be provided in any gas flow path that is likely to cause liquid water to enter. This application also has a similar advantageous effect of reducing a potential problem caused by freezing of liquid water inside of the solenoid valve.

The disclosure is not limited to any of the embodiments and their modifications described above but may be implemented by a diversity of other configurations without departing from the scope of the disclosure. For example, the technical features of any of the embodiments and their modifications may be replaced or combined appropriately, in order to solve part or all of the problems described above or in order to achieve part or all of the advantageous effects described above. Any of the technical features may be omitted appropriately unless the technical feature is described as essential herein. For example, the present disclosure may be implemented by aspects described below.

(1) According to one aspect of the present disclosure, there is provided a solenoid valve used in a gas flow path. The solenoid valve comprises a coil; a valve element receiving portion placed inside of the coil; a valve element placed inside of the valve element receiving portion and configured to be moved in an axial direction with supply of electricity to the coil; and a valve portion configured to open and close the gas flow path accompanied with move of the valve element. Either a surface of the valve element opposed to the valve element receiving portion or a surface of the valve element receiving portion opposed to the valve element has a first groove that is extended in the axial direction and a second groove that is arranged to intersect with the first groove and to be extended in a circumferential direction. The first groove is formed to be extended at least from the second groove toward a valve portion-side.

Even when liquid water included in a gas that is to be supplied to the solenoid valve enters a clearance between the valve element and the valve element receiving portion and is frozen, the configuration of the solenoid valve of this aspect reduces malfunction of the solenoid valve caused by freezing of water.

(2) In the solenoid valve of the above aspect, the first groove and the second groove may be formed in the valve element, and the first groove may be formed to be extended in the axial direction from a valve portion-side end of the valve element. The configuration of the solenoid valve of this aspect further facilitates discharge of water from the first groove and the second groove and thereby reduces a potential problem caused by freezing of liquid water.

(3) In the solenoid valve of the above aspect, the valve element may be configured such that a length in the axial direction between the second groove and the valve portion-side end of the valve element is shorter than a length in the axial direction between the second groove and an opposite-side end of the valve element that is opposite to the valve portion-side. The configuration of the solenoid valve of this aspect enables the liquid water entering the clearance between the valve element and the valve element receiving portion to be promptly spread in the circumferential direction by the second groove. This configuration thus further facilitates elimination of fixation of the valve element caused by freezing of water when the entering liquid water is frozen. The second groove that is configured to have a wider distance between the valve element and the valve element receiving portion serves to promptly keep the entering liquid water and thereby suppresses the entering liquid water from being frozen.

(4) The solenoid valve of the above aspect may further comprise a magnetic path forming member that includes a bottom face portion placed on the valve portion-side of the coil in the axial direction and that forms part of a magnetic path in the bottom face portion when electricity is supplied to the coil. An end of the bottom face portion near to the valve element receiving portion may be placed on the valve portion-side of a valve portion-side end of the second groove in a valve closed position of the valve portion. The configuration of the solenoid valve of this aspect further shortens the distance between the end of the bottom face and the valve element in the valve open position. This configuration makes it easier to form the magnetic path in the process of supplying electricity to the coil in the valve closed position and thereby reduces the power consumption.

(5) In the solenoid valve of the above aspect, the first groove and the second groove may be formed in the valve element receiving portion, and a valve portion-side end of the first groove may be located on the valve portion-side of a valve portion-side end of the valve element in a valve open position of the valve portion. The configuration of the solenoid valve of this aspect further facilitates discharge of water from the first groove and the second groove and reduces a potential problem caused by freezing of liquid water.

(6) In the solenoid valve of the above aspect, a valve portion-side end of the second groove may be located on the valve portion-side of a center in the axial direction of the valve element in the valve open position of the valve portion. Even when liquid water enters from the valve portion-side into the clearance between the valve element and the valve element receiving portion, the configuration of the solenoid valve of this aspect enables the entering liquid water to be more promptly introduced to the second groove. This configuration enhances the advantageous effect of reducing the problem of fixation of the valve element by freezing of liquid water.

(7) In the solenoid valve of the above aspect, an opposite-side end of the first groove that is opposite to the valve portion-side may be arranged to overlap with the second groove. The configuration of the solenoid valve of this aspect enables liquid water entering the clearance between the valve element and the valve element receiving portion to be more effectively introduced in the circumferential direction and further facilitates elimination of fixation of the valve element caused by freezing of water when the entering liquid water is frozen.

The disclosure may be implemented by any of various aspects other than the solenoid valve described above, for example, a valve element for the solenoid valve, a valve element receiving portion for the solenoid valve, or a method of freeze proofing of the solenoid valve.

What is claimed is:

1. A solenoid valve used in a gas flow path, comprising:
   a coil;
   a sleeve placed inside of the coil;
   a magnetic body placed inside of the sleeve and configured to be moved in an axial direction with supply of electricity to the coil;
   a valve portion configured to open and close the gas flow path accompanied with movement of the magnetic body, the valve portion including:
      a valve element leading end that is a part of the magnetic body at an end thereof; and
      a valve seat coming into contact with the valve element leading end accompanied with movement of the magnetic body;
   a first groove in an inner surface of the sleeve, the first groove extending in the axial direction;
   a second groove in the inner surface of the sleeve, the second groove intersecting the first groove and extending in a circumferential direction; and
   a spring that engages an opposite end of the magnetic body to the valve element leading end, the spring being housed outside the second groove, wherein the first groove extends at least from the second groove toward a valve portion-side of the sleeve.

2. The solenoid valve according to claim 1, further comprising:
a magnetic path forming member that includes a bottom face portion placed on a valve portion-side of the coil in the axial direction and that forms part of a magnetic path in the bottom face portion when electricity is supplied to the coil.

3. The solenoid valve according to claim 1, wherein a valve portion-side end of the first groove is located on a valve portion-side of a valve portion-side end of the magnetic body in a valve open position of the valve portion.

4. The solenoid valve according to claim 3, wherein a valve portion-side end of the second groove is located on a valve portion-side of a center in the axial direction of the magnetic body in the valve open position of the valve portion.

5. The solenoid valve according to claim 1, wherein an opposite-side end of the first groove that is opposite to a valve portion-side is arranged to overlap with the second groove.

* * * * *